United States Patent
Rudnick et al.

(10) Patent No.: US 12,400,248 B2
(45) Date of Patent: Aug. 26, 2025

(54) USER INTERFACE FOR ACCESSING MULTIPLE CATALOGS OF ITEMS AND INDICATING ITEMS ADDED FROM CATALOGS

(71) Applicant: Maplebear Inc., San Francisco, CA (US)

(72) Inventors: Christopher Hans Nietes Rudnick, Pacifica, CA (US); Imaan Munir, Los Angeles, CA (US); Eduardo Martin Alarcon Villaran, Toronto (CA); Miranda Bouck, Lincoln, NE (US); Uladzimir Bahatyrevich, Fair Oaks, CA (US)

(73) Assignee: Maplebear Inc., San Francisco, CA (US)

( * ) Notice: Subject to any disclaimer, the term of this patent is extended or adjusted under 35 U.S.C. 154(b) by 248 days.

(21) Appl. No.: 18/212,633

(22) Filed: Jun. 21, 2023

(65) Prior Publication Data

US 2024/0428304 A1 Dec. 26, 2024

(51) Int. Cl.
*G06Q 30/00* (2023.01)
*G06Q 30/0601* (2023.01)

(52) U.S. Cl.
CPC ..... *G06Q 30/0603* (2013.01); *G06Q 30/0633* (2013.01); *G06Q 30/0641* (2013.01)

(58) Field of Classification Search
CPC ............... G06Q 30/00; G06Q 30/0601; G06Q 30/0611; G06Q 30/0635; G06Q 30/0641; G06Q 30/0645
See application file for complete search history.

(56) References Cited

U.S. PATENT DOCUMENTS

| | | | |
|---|---|---|---|
| 8,380,880 B2 * | 2/2013 | Gulley | G06F 9/5055 709/227 |
| 10,515,140 B1 * | 12/2019 | Scott | G06F 3/048 |
| 11,074,643 B1 * | 7/2021 | Ellithorpe | G06Q 20/14 |
| 2005/0197992 A1 * | 9/2005 | Kipersztok | G06F 40/30 706/50 |
| 2006/0095373 A1 * | 5/2006 | Venkatasubramanian | G06Q 20/102 705/40 |
| 2007/0038471 A1 * | 2/2007 | Meisel | G16H 10/20 705/2 |
| 2008/0037482 A1 * | 2/2008 | Douglas | H04W 24/00 370/338 |

(Continued)

OTHER PUBLICATIONS

Alger, Michael. "Cylindrical User Interface with Infinite Scrolling." (2017). (Year: 2017).*

*Primary Examiner* — Christopher B Seibert
(74) *Attorney, Agent, or Firm* — Fenwick & West LLP

(57) ABSTRACT

A scrollable listing of icons associated with catalogs is displayed, in which the scrollable listing of icons is overlaid onto a page and remains fixed when the page is scrolled, each icon is associated with a catalog, and each icon is displayed with an indication of a set of items selected from a corresponding catalog. In response to a user selection of an icon from the scrollable listing of icons, the page is updated to include items included in a catalog associated with the selected icon. In response to a user selection to add an item from the page including the items, the indication displayed with the selected icon in the scrollable listing of icons is updated to indicate the added item.

20 Claims, 9 Drawing Sheets

(56) References Cited

U.S. PATENT DOCUMENTS

| | | | |
|---|---|---|---|
| 2008/0235585 A1* | 9/2008 | Hart | G06F 16/44 715/717 |
| 2008/0244376 A1* | 10/2008 | Gottlieb | G06F 8/38 715/211 |
| 2010/0121688 A1* | 5/2010 | Marsch | G06Q 10/0639 705/7.38 |
| 2010/0145814 A1* | 6/2010 | Meghani | G06Q 30/06 705/26.1 |
| 2010/0299628 A1* | 11/2010 | Har'El | G06F 9/451 715/800 |
| 2011/0131309 A1* | 6/2011 | Akiyama | H04L 12/14 709/223 |
| 2011/0138050 A1* | 6/2011 | Dawson | H04L 67/63 709/226 |
| 2011/0138051 A1* | 6/2011 | Dawson | G06F 9/5072 709/226 |
| 2011/0173062 A1* | 7/2011 | Chen | G06Q 30/0241 705/14.35 |
| 2011/0246501 A1* | 10/2011 | McMenamin | G16B 50/00 707/769 |
| 2011/0276590 A1* | 11/2011 | Hayes | G06Q 10/107 707/769 |
| 2012/0054603 A1* | 3/2012 | Demant | G06F 3/0485 715/247 |
| 2012/0089486 A1* | 4/2012 | Mahakian | G06Q 30/0635 705/26.81 |
| 2012/0226808 A1* | 9/2012 | Morgan | G06Q 30/04 709/226 |
| 2012/0232991 A1* | 9/2012 | Zealer | G06Q 30/00 705/14.55 |
| 2012/0304191 A1* | 11/2012 | Morgan | G06F 9/5088 718/105 |
| 2013/0042005 A1* | 2/2013 | Boss | H04L 43/0876 709/226 |
| 2013/0097480 A1* | 4/2013 | Allison | G06Q 10/10 715/223 |
| 2013/0166334 A1* | 6/2013 | Liberty | G06Q 10/02 705/26.61 |
| 2013/0169566 A1* | 7/2013 | Vargas | G06F 21/34 345/173 |
| 2014/0006978 A1* | 1/2014 | Meehan | G11B 27/034 715/760 |
| 2014/0172805 A1* | 6/2014 | Leung | G06Q 10/10 707/692 |
| 2014/0214937 A1* | 7/2014 | Giacobbe | G06Q 10/06311 709/204 |
| 2014/0223311 A1* | 8/2014 | Auer | G06F 3/0482 715/730 |
| 2014/0229860 A1* | 8/2014 | Rogers | G06Q 10/06311 715/753 |
| 2015/0024792 A1* | 1/2015 | Granito | H04L 51/58 455/457 |
| 2015/0035437 A1* | 2/2015 | Panopoulos | H05B 47/175 315/291 |
| 2015/0039461 A1* | 2/2015 | Gadre | G06Q 30/0635 705/26.81 |
| 2015/0160989 A1* | 6/2015 | Maes | G06Q 30/0276 719/313 |
| 2015/0237128 A1* | 8/2015 | Castro | H04L 67/04 726/4 |
| 2015/0347533 A1* | 12/2015 | Shakirzianov | G06F 8/20 717/104 |
| 2016/0048307 A1* | 2/2016 | Troyer | G06F 9/454 715/801 |
| 2016/0091337 A1* | 3/2016 | Weast | A61B 5/02438 701/439 |
| 2016/0247119 A1* | 8/2016 | Goates | G06Q 10/1053 |
| 2016/0283925 A1* | 9/2016 | Lavu | G06Q 20/401 |
| 2016/0364772 A1* | 12/2016 | Denton | G06Q 30/0242 |
| 2017/0052652 A1* | 2/2017 | Denton | G06Q 50/01 |
| 2018/0032997 A1* | 2/2018 | Gordon | G06Q 30/0269 |
| 2018/0225748 A1* | 8/2018 | Selcuk | G06Q 30/0601 |
| 2018/0276404 A1* | 9/2018 | Dotan-Cohen | G06F 21/6245 |
| 2018/0336730 A1* | 11/2018 | Bastian | G06T 15/503 |
| 2018/0344919 A1* | 12/2018 | Jones | G09B 23/303 |
| 2018/0365278 A1* | 12/2018 | Klöhn | G06F 16/51 |
| 2019/0095507 A1* | 3/2019 | Elisseeff | G06N 5/01 |
| 2019/0177993 A1* | 6/2019 | Shell | E04H 1/12 |
| 2019/0180875 A1* | 6/2019 | Gagne | G16H 10/20 |
| 2020/0089396 A1* | 3/2020 | Shrivastava | G06F 3/0481 |
| 2020/0118062 A1* | 4/2020 | Greenwell | G06Q 10/1091 |
| 2020/0177710 A1* | 6/2020 | Wyatt | G06F 9/451 |
| 2020/0184579 A1* | 6/2020 | Nitzschke | G06Q 20/42 |
| 2020/0242575 A1* | 7/2020 | Shell | A61L 2/22 |
| 2021/0158420 A1* | 5/2021 | Canfield | G06F 16/953 |
| 2021/0357209 A1* | 11/2021 | Ramachandra | G06F 40/174 |
| 2022/0237672 A1* | 7/2022 | Tang | G06Q 30/0603 |
| 2024/0062279 A1* | 2/2024 | Scully | G06F 3/013 |

* cited by examiner

USER INTERFACE FOR ACCESSING MULTIPLE CATALOGS OF ITEMS AND INDICATING ITEMS ADDED FROM CATALOGS

BACKGROUND

Online systems, such as online concierge systems, provide customers with the convenience of placing orders that are subsequently fulfilled on their behalf and delivered to them. When using online systems, customers may add items to shopping lists for multiple retailers. For example, if a customer is planning on making a particular dish, due to differences in availabilities, prices, qualities, etc. of the items at retailer locations operated by different grocery retailers, the customer may order the ingredients for the dish from multiple grocery retailers by adding some of the ingredients to a shopping list for each grocery retailer.

However, when managing shopping lists for multiple retailers, customers may often have to switch between the shopping lists, which may be cumbersome. For example, when using an online system that fulfills orders for multiple retailers, after adding items to a shopping list for a first retailer, a customer may have to access a home page for the online system, search for and select a second retailer, and search the inventory of the second retailer to add items to the shopping list for the second retailer. In this example, the customer may have to repeat this process to add items to a shopping list for a third retailer or to add additional items to the shopping list for the first retailer. In the above example, the customer may find it difficult to keep track of items they have added to the shopping lists for the retailers and may have to switch between the shopping lists to remind themselves of which items have been added to them.

SUMMARY

In accordance with one or more aspects of the disclosure, a scrollable listing of icons that allows access to catalogs of items and indicates items added from catalogs is displayed. More specifically, a scrollable listing of icons is displayed, in which the scrollable listing of icons is overlaid onto a page and remains fixed when the page is scrolled, each icon is associated with a catalog included among multiple catalogs, and each icon is displayed with an indication of a set of items selected from a corresponding catalog. In response to a user selection of an icon from the scrollable listing of icons, the page is updated to include items included in a catalog associated with the selected icon. In response to a user selection to add an item from the page including the items, the indication displayed with the selected icon in the scrollable listing of icons is updated to indicate the added item.

DETAILED DESCRIPTION

Figure 1:
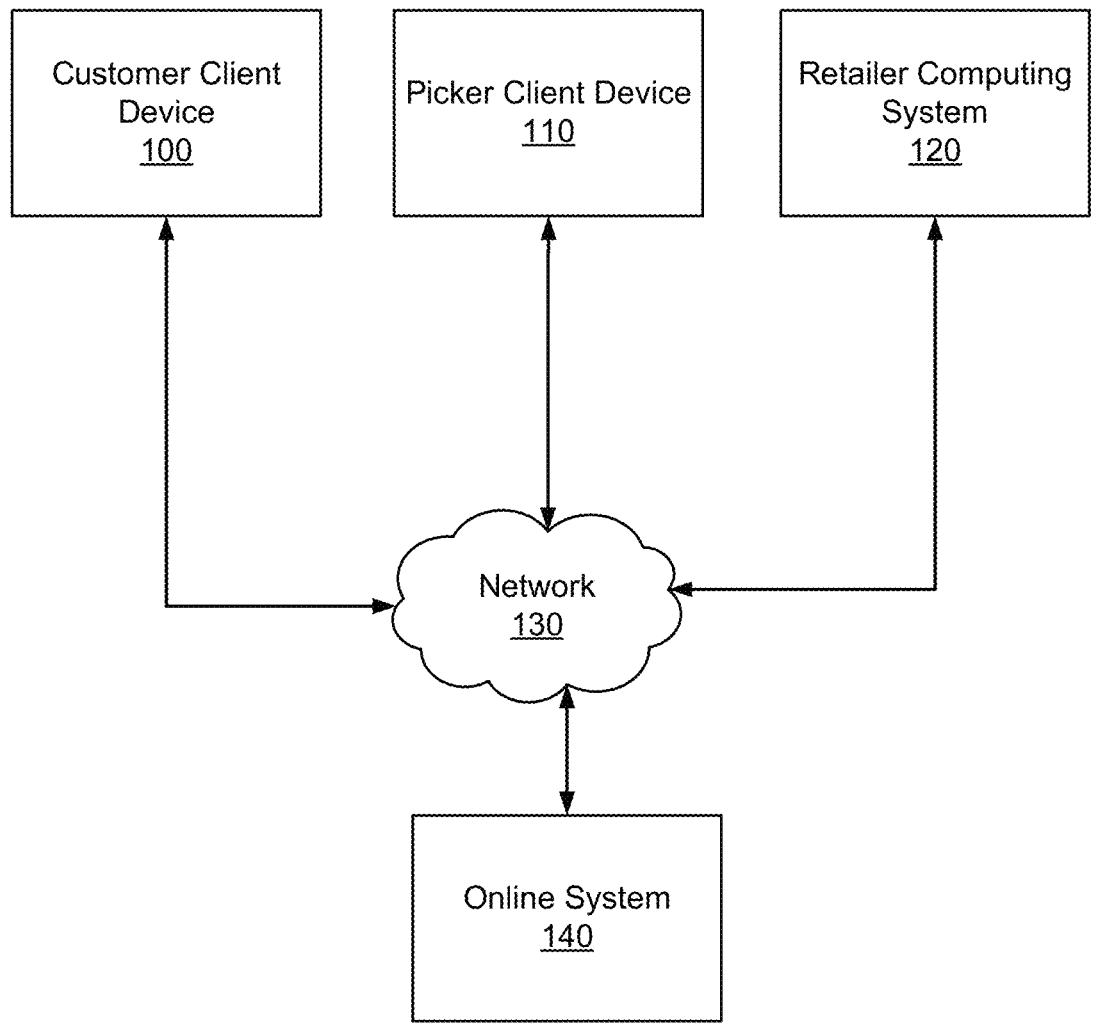
FIG. 1 illustrates an example system environment for an online system, in accordance with one or more embodiments.

FIG. 1 illustrates an example system environment for an online system 140, such as an online concierge system, in accordance with one or more embodiments. The system environment illustrated in FIG. 1 includes a customer client device 100, a picker client device 110, a retailer computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online system 140. Additionally, while one customer client device 100, picker client device 110, and retailer computing system 120 are illustrated in FIG. 1, any number of customers, pickers, and retailers may interact with the online system 140. As such, there may be more than one customer client device 100, picker client device 110, or retailer computing system 120.

The customer client device 100 is a client device through which a customer may interact with the picker client device 110, the retailer computing system 120, or the online system 140. The customer client device 100 can be a personal or mobile computing device, such as a smartphone, a tablet, a laptop computer, or a desktop computer. In some embodiments, the customer client device 100 executes a client application that uses an application programming interface (API) to communicate with the online system 140.

A customer uses the customer client device 100 to place an order with the online system 140. An order specifies a set of items to be delivered to the customer. An "item," as used herein, refers to a good or product, such as a food or beverage item, an article of clothing, a service, a video, a song, an image, a game, etc., that may be provided to the customer through the online system 140. The order may include item identifiers (e.g., a stock keeping unit or a price look-up code) for items to be delivered to the customer and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online system 140. The ordering interface may be part of a client application operating on the customer client device 100. The ordering interface allows the customer to search for items that are available through the online system 140 and the customer can select which items to add to a "shopping list." A "shopping list," as used herein, is a tentative set of items that the customer has selected for an order but that has not yet been finalized for an order. The ordering interface allows a customer to update the shopping list, e.g., by changing the quantity of items, adding or removing items, or adding instructions for items that specify how the items should be collected.

The customer client device 100 may receive additional content from the online system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the customer to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a retailer location. The picker client device 110 presents the items that are included in the customer's order to the picker in a collection interface. The collection interface is a user interface that provides information to the picker identifying items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 provides instructions to a picker for delivering the items for a customer's order. For example, the picker client device 110 displays a delivery location from the order to the picker. The picker client device 110 also provides navigation instructions for the picker to travel from the retailer location to the delivery location. If a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the customer client device 100 for display to the customer such that the customer can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online system 140. Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online system 140. As used herein, a "retailer" is an entity that operates a "retailer location," which is a store, warehouse, or other building from which a picker can collect items. The retailer computing system 120 stores and provides item data to the online system 140 and may regularly update the online system 140 with updated item data. For example, the retailer computing system 120 may provide item data indicating which items are available at a retailer location and the quantities of those items. Additionally, the retailer computing system 120 may transmit updated item data to the online system 140 when an item is no longer available at the retailer location. Additionally, the retailer computing system 120 may provide the online system 140 with updated item prices, sales, or availabilities. Additionally, the retailer computing system 120 may receive payment information from the online system 140 for orders serviced by the online system 140. Alternatively, the retailer computing system 120 may provide payment to the online system 140 for some portion of the overall cost of a customer's order (e.g., as a commission).

The customer client device 100, the picker client device 110, the retailer computing system 120, and the online system 140 may communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 may be an online concierge system by which customers can order items to be provided to them by a picker from a retailer. The online system 140 receives orders from a customer client device 100 through the network 130. The online system 140 selects a picker to service the customer's order and transmits the order to a picker client device 110 associated with the picker. The picker collects the ordered items from a retailer location and delivers the ordered items to the customer. The online system 140 may charge a customer for the order and provide portions of the payment from the customer to the picker and the retailer. As an example, the online system 140 may allow a customer to order groceries from a grocery store retailer. The customer's order may specify which groceries they want delivered from the grocery store and the quantities of each of the groceries. The customer client device 100 transmits the customer's order to the online system 140 and the online system 140 selects a picker to travel to the grocery store retailer location to collect the groceries ordered by the customer. Once the picker has collected the groceries ordered by the customer, the picker delivers the groceries to a location transmitted to the picker client device 110 by the online system 140. In some embodiments, rather than an online concierge system, the online system 140 may be an online music or video streaming service, an online gaming service, or any other suitable type of online system. The online system 140 is described in further detail below with regards to FIG. 2A.

Figure 2A:
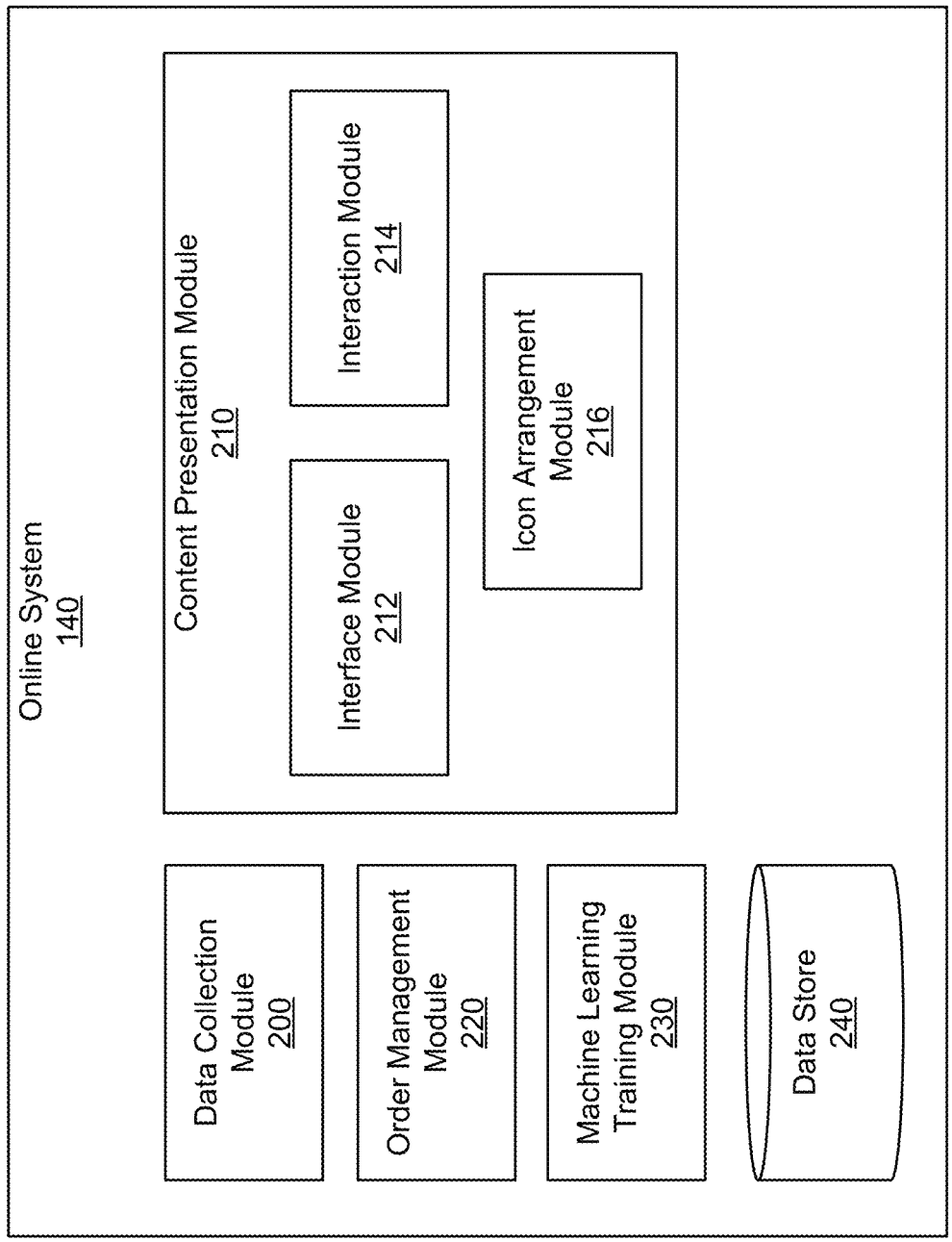
FIG. 2A illustrates an example system architecture for an online system, in accordance with one or more embodiments.

FIG. 2A illustrates an example system architecture for an online system 140, such as an online concierge system, in accordance with some embodiments. The system architecture illustrated in FIG. 2A includes a data collection module 200, a content presentation module 210, an order management module 220, a machine learning training module 230, and a data store 240. Alternative embodiments may include more, fewer, or different components from those illustrated in FIG. 2A, and the functionality of each component may be divided between the components differently from the description below. In various embodiments, the functionality of each component may be divided between the components of the online system 140 and the client application 250, described below. Additionally, each component may perform their respective functionalities in response to a request from a human, or automatically without human intervention.

The data collection module 200 collects data used by the online system 140 and stores the data in the data store 240. The data collection module 200 may only collect data describing a user if the user has previously explicitly consented to the online system 140 collecting data describing the user. Additionally, the data collection module 200 may encrypt all data, including sensitive or personal data, describing users.

The data collection module 200 collects customer data, which is information or data that describe characteristics of a customer. Customer data may include a customer's name, address, shopping preferences, favorite items, stored payment instruments, budget (e.g., for each order or for certain item categories), dietary preferences (e.g., vegetarian, gluten-free, etc.), or demographic information (e.g., age, gender, etc.). In some embodiments, customer data also describe characteristics of a customer's household, such as the customer's household size or information describing other members of the customer's household (e.g., their age, dietary preferences, etc.). Customer data also may include information identifying a customer, such as a phone number, an email address, etc. associated with the customer. The customer data also may include default settings established by the customer, such as a default retailer/retailer location, payment instrument, delivery location, or delivery timeframe.

Customer data also may include historical information associated with a customer. For example, customer data may describe historical interaction information associated with a customer, such as a search or a browsing history of the customer, and historical order information associated with the customer, such as information describing previous orders placed by the customer (e.g., information identifying items included in the orders, prices of the items, discounts applied to the items, etc.). Customer data further may include information describing retailers (e.g., names, types, geographical locations of retailer locations operated by the retailers, etc.) and items (e.g., types, prices, etc.) with which a customer interacted (e.g., by searching for the items, clicking on them, adding them to a shopping list, etc.). Furthermore, customer data may include information associated with a customer that may be determined based on other customer data for the customer, such as a frequency with which the customer places orders or orders an item, an average number of items included in each order placed by the customer, a price sensitivity of the customer (e.g., for certain item categories), or any other suitable types of information. The data collection module 200 may collect the customer data from sensors on the customer client device 100 or based on the customer's interactions with the online system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the brands, sizes, dimensions, weights, volumes, counts/quantities, colors, models/versions, stock keeping units (SKUs), serial numbers, prices, item categories, sales, discounts, qualities (e.g., freshness, ripeness, etc.), seasonality, perishability, ingredients/materials, manufacturing locations, or any other suitable attributes of the items. The item data may further include purchasing rules associated with each item, if they exist. For example, age-restricted items such as alcohol and tobacco are flagged accordingly in the item data. Item data may also include information that is useful for predicting the availability of items at retailer locations. For example, for each item-retailer combination (a particular item at a particular retailer location), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or a customer client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects catalog data, which is information or data associated with a catalog. The data collection module 200 may receive catalog data from an entity associated with a catalog (e.g., a retailer computing system 120 associated with a retailer that offers items included in the catalog for purchase) or any other suitable source. Catalog data may include a name associated with a catalog (e.g., a retailer or a brand), an icon associated with the catalog (e.g., a logo), campaigns associated with the catalog, content items including advertisements, coupons, promotions, recipes, images (e.g., photographs), videos, associated with the catalog, or any other suitable types of information associated with a catalog. Catalog data also may include information describing items (e.g., products, services, videos, music, images, games, etc.) included in a catalog. For example, catalog data may include information describing each item (e.g., its brand, size, color(s), model/version, SKU, serial number, price, etc.) included in a catalog. A catalog of items may be human-generated and human-populated (e.g., based on stock keeping units (SKUs) associated with items included among an inventory of a retailer). A catalog also may be generated by the data collection module 200 by querying data stored in the data store 240. For example, the data collection module 200 may query item data in the data store 240 for items by a "retailer" field to generate a catalog of items associated with each retailer.

The data collection module 200 also collects picker data, which is information or data that describes characteristics of pickers. For example, the picker data for a picker may include the picker's name, the picker's location, how often the picker has serviced orders for the online system 140, a customer rating for the picker, the retailers from which the picker has collected items, or the picker's previous shopping history. Additionally, the picker data may include preferences expressed by the picker, such as their preferred retailers for collecting items, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. Components of the content presentation module 210 include: an interface module 212, an interaction module 214, and an icon arrangement module 216, which are further described below. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. In this example, the content presentation module 210 then displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weigh the score for an item based on the predicted availability of the item. Alternatively, the content presentation module 210 may filter out items from presentation to a customer based on whether the predicted availability of the item exceeds a threshold.

The interface module 212 generates and transmits a scrollable listing of icons with which a customer may interact. The icons in the scrollable listing of icons may be associated with catalogs, such that each icon is associated with a different catalog. Each icon in the scrollable listing of icons may be an image, such as a logo, a symbol, or other graphical representation associated with a corresponding catalog. In various embodiments, each catalog associated with an icon is associated with an entity (e.g., a retailer). For example, a catalog associated with an icon may be a catalog of products offered for purchase by a retailer and an icon associated with the catalog in the scrollable listing of icons may be a logo for the retailer. The scrollable listing of icons allows the customer to access multiple catalogs, such that the customer may access a catalog associated with an icon by interacting with the icon. The scrollable listing of icons may be scrollable along an axis (e.g., in a horizontal or a vertical direction) and may include a scrollable bar in which the icons are arranged. The arrangement of the icons may be determined by the icon arrangement module 216, which is further described below.

When displayed, the scrollable listing of icons is overlaid onto a page with which the customer may interact. The scrollable listing of icons may remain fixed when the page onto which it is overlaid is scrolled. For example, if the scrollable listing of icons is overlaid onto the bottom of the page, the scrollable listing of icons does not change its position as the page is scrolled vertically or horizontally. Furthermore, the scrollable listing of icons also may persist when the page onto which it is overlaid is updated. In some embodiments, the scrollable listing of icons and the page onto which it is overlaid are scrollable along different axes. For example, the scrollable listing of icons may be horizontally scrollable while the page onto which it is overlaid may be vertically scrollable, or vice versa.

As described above, each icon in the scrollable listing of icons is associated with a catalog. A catalog may include items, such as goods (e.g., food, beverages, clothing, etc.), services (e.g., video streaming services), videos (e.g., movies, shows, etc.), audio files (e.g., music albums, podcasts, etc.), images (e.g., photos, GIFs), games (e.g., mobile gaming applications), or any other suitable types of items. For example, each icon in the scrollable listing of icons may be associated with a catalog of items, such that a customer may add one or more items included in a catalog to a list. In this example, a catalog may include goods or products that the customer may add to a shopping list and subsequently order. In the above example, a catalog also may include shows or movies that the customer may add to a watch list, songs or podcasts that the customer may add to a playlist, photos that the customer may add to a list of saved or favorite images, etc.

Each icon in the scrollable listing of icons may be displayed with various types of information associated with a corresponding catalog. This information may allow a customer to manage shopping sessions associated with multiple catalogs simultaneously. Examples of such types of information include: an indication of a set of items selected from the catalog, a total cost associated with the set of items selected from the catalog, a delivery time for an order including the set of items selected from the catalog, or any other suitable types of information. For example, if three items have been selected from a catalog, such that they have been added to a shopping list associated with the catalog, an icon associated with the catalog may be displayed with a "3" beside it, along with a total cost associated with the three items. In the above example, as items are added to the shopping list, the icon associated with the catalog also may be displayed with a delivery time for the items (e.g., "Delivery by 12 pm") beside it.

Information displayed with an icon may be dynamic. In some embodiments, this information changes periodically. For example, information displayed with an icon associated with a catalog may change every five seconds by switching between a delivery time for an order including items selected from the catalog and a number and total cost of the items in a shopping list associated with the catalog. Alternatively, in some embodiments, information displayed with an icon changes in response to a user interaction. For example, suppose that by default, an icon associated with a catalog is displayed with a delivery time for an order including one or more items selected from the catalog. In this example, when an item included in the catalog is added to a shopping list associated with the catalog, an indication that the item has been added to the shopping list (e.g., "1 item added to shopping list") may temporarily replace the delivery time.

The interface module 212 also updates the scrollable listing of icons and transmits the updated scrollable listing of icons. In some embodiments, the interface module 212 updates information displayed with an icon included in the scrollable listing of icons in response to receiving a user interaction. For example, in response to receiving a user selection to add an item from a catalog to a shopping list associated with the catalog or to remove an item from the shopping list, the interface module 212 may update the scrollable listing of icons, such that an indication of a number of items included in the shopping list associated with the catalog displayed beside the icon reflects the number of items in the shopping list. In the above example, the interface module 212 also may update the scrollable listing of icons to include a total cost associated with the items in the shopping list beside the icon. Continuing with the above example, in response to receiving a user selection to return to a home page associated with the online system 140, the interface module 212 may update the scrollable listing of icons by collapsing the information displayed with the icon (e.g., to only include the indication of the number of items in the shopping list).

The interface module 212 also may update the scrollable listing of icons in other ways. In some embodiments, the interface module 212 updates the scrollable listing of icons to include a name associated with each icon in response to receiving a user interaction with the scrollable listing of icons. For example, in response to receiving a user selection to scroll through the scrollable listing of icons, the interface module 212 may update the scrollable listing of icons to include a name of a retailer associated with each icon. In this example, in response to receiving a user selection anywhere other than the scrollable listing of icons, the interface module 212 may update the scrollable listing of icons, such that it no longer includes the name of the retailer associated with each icon. In some embodiments, the interface module 212 updates the arrangement of the icons included in the scrollable listing of icons, which may be determined by the icon arrangement module 216, as further described below.

The interface module 212 also generates and transmits the page onto which the scrollable listing of icons is overlaid. In some embodiments, the page onto which the scrollable listing of icons is overlaid is a home page associated with the online system 140. The home page may include user interface elements (e.g., buttons to reorder items or to access customer profile information, scroll bars, menus, etc.), content items (e.g., advertisements, images, videos, etc.) associated with various retailers, information associated with the online system 140, or any other suitable types of content. For example, the home page may include various advertisements, coupons, etc. for items included among the inventories of various retailers that allow customers who interact with them to add the items to shopping lists associated with the corresponding retailers. The page onto which the scrollable listing of icons is overlaid may include information associated with a catalog, such as one or more items included in the catalog, user interface elements that allow a customer to interact with the page (e.g., buttons to reorder items or to return to the home page associated with the online system 140, scroll bars, menus, etc.), or any other suitable types of content. For example, the page onto which the scrollable listing of icons is overlaid may be a storefront associated with a retailer, in which the page includes items included in a catalog associated with the retailer, promotions associated with one or more items included in the catalog, campaigns associated with the catalog, advertisements for new items added to the catalog, etc. As an additional example, if a catalog is associated with a retailer, the page onto which the scrollable listing of icons is overlaid may include a list of retailer locations associated with the retailer within a threshold distance of a location associated with a customer, hours of operation associated with each retailer location, etc.

The interface module 212 also updates the page onto which the scrollable listing of icons is overlaid and transmits the updated page. In some embodiments, the interface module 212 updates the page onto which the scrollable listing of icons is overlaid in response to receiving a user selection of an icon from the scrollable listing of icons, such that the page is updated to include one or more items included in a catalog associated with the selected icon or other information associated with the catalog. For example, in response to receiving a user selection of an icon, the page may be updated to be a storefront for a retailer, such that the page includes items offered for purchase by the retailer included in a catalog associated with the selected icon and details associated with each item (e.g., its price and availability at a particular retailer location operated by the retailer). Alternatively, in the above example, the page may be updated to include information associated with the retailer, such as a list of retailer locations associated with the retailer within a threshold distance of a location associated with a customer, hours of operation associated with each retailer location, etc. In some embodiments, the interface module 212 updates the page onto which the scrollable listing of icons is overlaid in response to receiving a user selection to return to a home page associated with the online system 140. For example, the page may be updated to be a home page associated with the online system 140, such that it includes user interface elements to navigate the home page, content items associated with various retailers, information associated with the online system 140, etc.

Once the interface module 212 updates and transmits the page onto which the scrollable listing of icons is overlaid, a customer may interact with the updated page. For example, suppose that the interface module 212 updates the page onto which the scrollable listing of icons is overlaid to include items from a catalog associated with a selected icon. In this example, a customer may interact with the updated page by selecting an option to add an item to a shopping list associated with the catalog, to view more information associated with an item, to search for an item, to check out, to return to the home page associated with the online system 140, etc.

The interaction module 214 receives user interactions with the scrollable listing of icons or the page onto which the scrollable listing of icons is overlaid. The interaction module 214 may differentiate between different types of interactions detected by the customer client device 100. For example, the interaction module 214 may differentiate between different types of gestures performed by a customer based on information received by sensors on a customer client device 100. In this example, the interaction module 214 may receive a user selection to scroll through the scrollable listing of icons or the page onto which the scrollable listing of icons is overlaid if information describing a swiping action is detected at the customer client device 100 associated with the scrollable listing of icons or the page, respectively. In the above example, the interaction module 214 also may receive a user selection of an icon from the scrollable listing of icons or to add an item to a shopping list from the page onto which the scrollable listing of icons is overlaid if information describing a tapping action is detected at the customer client device 100 associated with the icon or item, respectively.

The icon arrangement module 216 determines the arrangement of icons in the scrollable listing of icons. In some embodiments, the icon arrangement module 216 makes this determination based on various types of information associated with a customer, such as an order history associated with the customer, a set of preferences associated with the customer, or any other suitable types of information. For example, suppose that each icon included in the scrollable listing of icons is associated with a retailer. In this example, the icon arrangement module 216 may determine the arrangement of icons based on a set of preferences associated with a customer and an order history associated with the customer, such that icons associated with retailers from which the customer most frequently ordered items and that are most likely to have the customer's favorite items in stock are in the most prominent positions of the scrollable listing of icons (e.g., furthest to the left).

In some embodiments, the icon arrangement module 216 determines the arrangement of icons in the scrollable listing of icons based on a predicted likelihood of conversion by a customer associated with each catalog associated with the icons. A conversion may correspond to adding one or more items included in a catalog to a list (e.g., a shopping list, a watch list, a wish list, a playlist, etc.), ordering one or more items included in a catalog, or any other suitable type of action associated with a catalog that may be performed by a customer. In embodiments in which the icon arrangement module 216 determines the arrangement of icons in the scrollable listing of icons based on a predicted likelihood of conversion by a customer associated with each catalog associated with the icons, the icon arrangement module 216 may make the prediction based on information associated with the customer (e.g., the customer's order history, preferences, etc.). For example, the icon arrangement module 216 may predict a high likelihood of conversion by a customer associated with a catalog if the customer previously placed several orders including items included in the catalog, if the catalog includes several of the customer's favorite items and the items are likely to be available, etc. Alternatively, in the above example, the icon arrangement module 216 may predict a low likelihood of conversion by the customer associated with the catalog if the customer has never placed orders including items included in the catalog, if the catalog includes none of the customer's favorite items or if the customer's favorite items included in the catalog are unlikely to be available, etc.

In some embodiments, the icon arrangement module 216 predicts a likelihood of conversion by a customer associated with a catalog using a conversion prediction model, which is a machine learning model that is trained to predict a likelihood of conversion by a customer associated with a catalog. The conversion prediction model may be trained by the machine learning training module 230 based on attributes of catalogs, attributes of items included in the catalogs, attributes of customers, or any other suitable types of information, as described below. To use the conversion prediction model, the icon arrangement module 216 may access the model (e.g., from the data store 240) and apply the model to a set of attributes of a customer (e.g., household size, historical order information, price sensitivity, budget, etc. associated with the customer) and a set of attributes of a catalog (e.g., a retailer or other entity associated with the catalog, information describing items included in the catalog, etc.). The icon arrangement module 216 also may apply the model to a set of attributes of items included in the catalog (e.g., brands, item categories, price ranges, predicted availabilities, etc. of the items). The icon arrangement module 216 may then receive an output from the conversion prediction model corresponding to a predicted likelihood of conversion by the customer associated with the catalog.

Once the icon arrangement module 216 has predicted a likelihood of conversion by a customer associated with each catalog associated with the icons in the scrollable listing of icons, the icon arrangement module 216 may rank the catalogs based on the predicted likelihoods and determine the arrangement of the icons in the scrollable listing of icons based on the ranking. For example, the icon arrangement module 216 may rank the catalogs based on their associated predicted likelihoods of conversion by the customer, such that catalogs associated with higher predicted likelihoods are ranked higher than catalogs associated with lower predicted likelihoods. In this example, the icon arrangement module 216 may determine the arrangement of icons in the scrollable listing of icons based on the ranking, such that the icon associated with the highest ranked catalog is in a most prominent position of the scrollable listing of icons (e.g., furthest to the left), the icon associated with the second-highest ranked catalog is in a second-most prominent position, etc.

In some embodiments, the icon arrangement module 216 also or alternatively determines the arrangement of icons in the scrollable listing of icons based on additional types of information. The icon arrangement module 216 may rank the catalogs based on the additional information and determine the arrangement of icons in the scrollable listing of icons based on the ranking. For example, based on a likelihood of conversion by a customer associated with each catalog associated with the icons in the scrollable listing of icons and one or more bid amounts associated with one or more catalogs (e.g., computed as a sum of the predicted likelihood associated with each catalog and a bid amount associated with the catalog, if any), the icon arrangement module 216 may rank the catalogs. In this example, the icon arrangement module 216 may determine the arrangement of icons in the scrollable listing of icons based on the ranking, such that the icon associated with the highest ranked catalog is in a most prominent position of the scrollable listing of icons (e.g., furthest to the left), the icon associated with the second-highest ranked catalog is in a second-most prominent position, etc.

The icon arrangement module 216 also or alternatively may determine the arrangement of icons in the scrollable listing of icons based on a recency with which a customer interacted with each catalog, based on a number of items selected from each catalog (e.g., to include in a shopping list), based on a delivery time associated with each catalog, or based on any other suitable types of information. For example, in response to receiving a user selection to add an item to a shopping list associated with a catalog, the icon arrangement module 216 may determine the arrangement of the icons in the scrollable listing of icons, such that an icon associated with the catalog is placed in a most prominent position of the scrollable listing of icons (e.g., furthest to the left) or is separated from the other icons to indicate that it is associated with a catalog with which a customer most recently interacted. As an additional example, the icon arrangement module 216 may determine the arrangement of the icons in the scrollable listing of icons based on the numbers of items included in shopping lists associated with the icons, such that the icons are ordered from left to right in descending order of number of items included in the shopping lists associated with the icons. As yet another example, the icon arrangement module 216 may determine the arrangement of the icons in the scrollable listing of icons based on the delivery times associated with the catalogs associated with the icons, such that the icons are ordered from left to right from earliest delivery time to latest delivery time.

The order management module 220 manages orders for items from customers. The order management module 220 receives orders from customer client devices 100 and assigns the orders to pickers for service based on picker data. For example, the order management module 220 assigns an order to a picker based on the picker's location and the retailer location from which the ordered items are to be collected. The order management module 220 may also assign an order to a picker based on how many items are in the order, a vehicle operated by the picker, the delivery location, the picker's preferences for how far to travel to deliver an order, the picker's ratings by customers, or how often a picker agrees to service an order.

In some embodiments, the order management module 220 determines when to assign an order to a picker based on a delivery timeframe requested by the customer who placed the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit instructions to the picker client device 110 to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online system 140. The online system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model is used by the machine learning model to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

In embodiments in which the icon arrangement module 216 accesses a conversion prediction model that is trained to predict a likelihood of conversion by a customer associated with each catalog associated with the icons included in the scrollable listing of icons, the machine learning training module 230 may train the conversion prediction model. The machine learning training module 230 may train the conversion prediction model via supervised learning based on attributes of catalogs, attributes of items included in the catalogs, attributes of customers, or any other suitable types of information. To illustrate an example of how the conversion prediction model may be trained, suppose that the machine learning training module 230 receives a set of training examples. In this example, the set of training examples may include attributes of catalogs presented to customers, such as retailers or other entities associated with the catalogs, information describing items included in the catalogs, and attributes of items included in the catalogs, such as sizes, colors, prices, item categories, brands, sales, discounts, qualities, ingredients, materials, manufacturing locations, predicted availabilities, etc. associated with the items. Continuing with this example, the set of training examples also may include attributes of customers presented with the catalogs (e.g., names, geographical locations, favorite items, dietary preferences, etc. associated with the customers). In the above example, the machine learning training module 230 also may receive labels which represent expected outputs of the conversion prediction model, in which a label indicates whether a customer performed a conversion associated with a catalog. Continuing with this example, the machine learning training module 230 may then train the conversion prediction model based on the attributes, as well as the labels by comparing its output from input data of each training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In situations in which the training example includes a label, the loss function is also based on the label for the training example. Some example loss functions include the mean square error function, the mean absolute error, the hinge loss function, and the cross-entropy loss function. The machine learning training module 230 updates the set of parameters for the machine learning model based on the score generated by the loss function. For example, the machine learning training module 230 may apply gradient descent to update the set of parameters.

The data store 240 stores data used by the online system 140. For example, the data store 240 stores customer data, item data, order data, picker data, and catalog data for use by the online system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

Figure 2B:
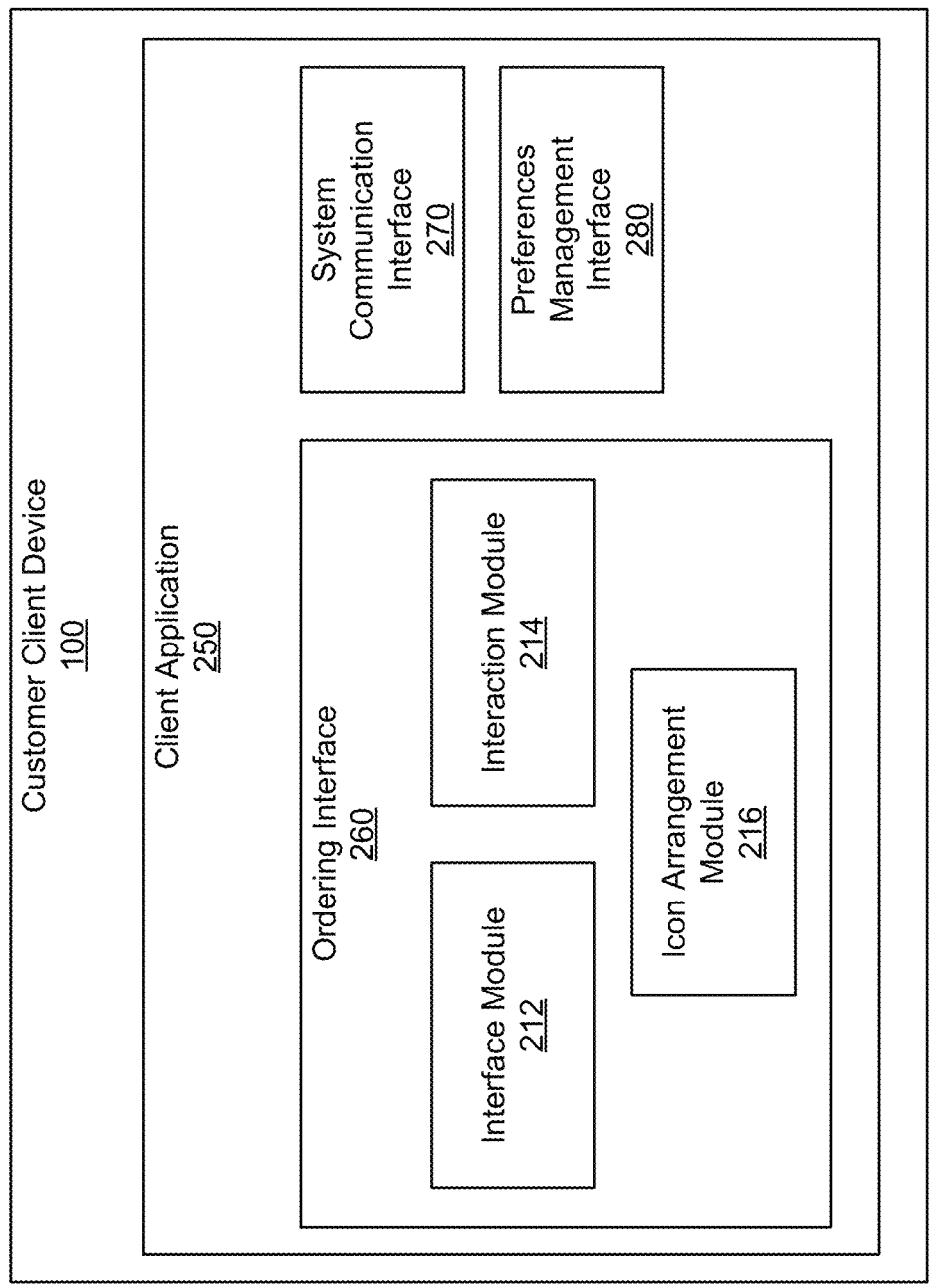
FIG. 2B illustrates an example system architecture for a client application executing on a customer client device, in accordance with one or more embodiments.

FIG. 2B illustrates an example system architecture for a client application 250 executing on a customer client device 100, in accordance with one or more embodiments. The system architecture illustrated in FIG. 2B includes an ordering interface 260, a system communication interface 270, and a preferences management interface 280. Alternative embodiments may include more, fewer, or different components from those illustrated in FIG. 2B, and the functionality of each component may be divided between the components differently from the description below. In various embodiments, the functionality of each component may be divided between the components of the client application 250 and the online system 140. Additionally, each component may perform their respective functionalities in response to a request from a human, or automatically without human intervention.

The ordering interface 260 provides an interactive interface which a customer may use to browse through and select items and place an order. Components of the ordering interface 260 include: the interface module 212, the interaction module 214, and the icon arrangement module 216, which function in a manner analogous to that described above in conjunction with FIG. 2A. For example, the interface module 212 generates, updates and displays the scrollable listing of icons and the page onto which the scrollable listing of icons is overlaid. The system communication interface 270 receives inventory information from the online system 140 and transmits order information to the online system 140. The system communication interface 270 also may receive various types of data from the online system 140, such as customer data, order data, catalog data, outputs of the conversion prediction model, etc. or allow the components of the client application 250 to access data, machine learning models, etc. stored in the online system 140. The preferences management interface 280 allows a customer to manage basic information associated with his/her account, such as his/her home address and payment instruments. The preferences management interface 280 may also allow a customer to manage other details such as his/her favorite or preferred retailer locations, preferred delivery times, special instructions for delivery, etc.

Figure 3:
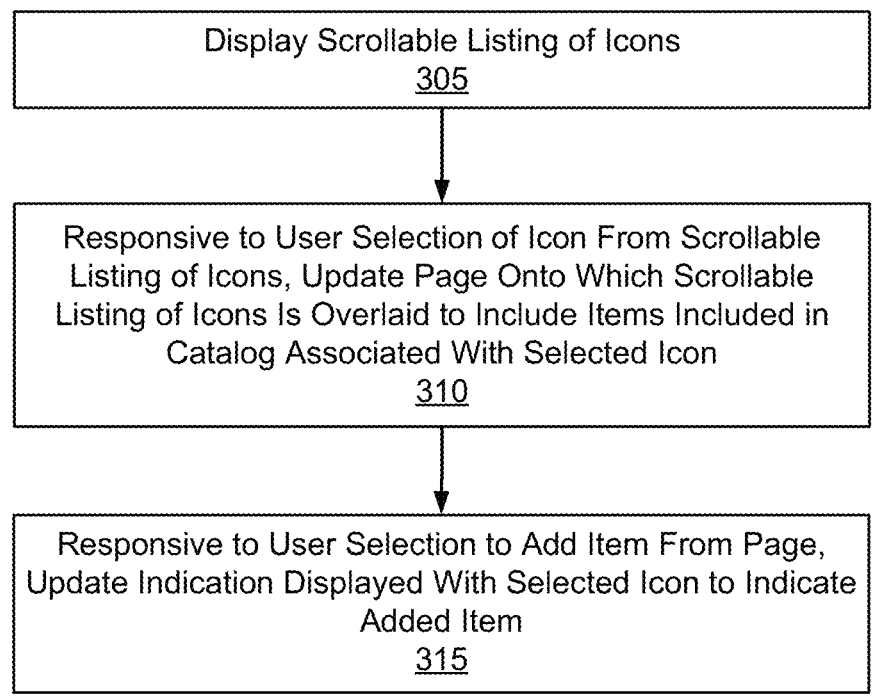
FIG. 3 is a flowchart of a method for displaying a scrollable listing of icons that allows access to catalogs of items and indicates items added from catalogs, in accordance with one or more embodiments.

Displaying a Scrollable Listing of Icons that Allows Access to Catalogs of Items and Indicates Items Added from Catalogs FIG. 3 is a flowchart of a method for displaying a scrollable listing of icons that allows access to catalogs of items and indicates items added from catalogs, in accordance with some embodiments. Alternative embodiments may include more, fewer, or different steps from those illustrated in FIG. 3, and the steps may be performed in a different order from that illustrated in FIG. 3. These steps may be performed by an online system (e.g., online system 140), such as an online concierge system, or by a client application (e.g., client application 250), such as a customer mobile application, executing on a customer client device (e.g., customer client device 100). Additionally, each of these steps may be performed automatically by the online system 140 or the client application 250 without human intervention.

The client application 250 or the online system 140 generates (e.g., using the interface module 212) and transmits/displays 305 (e.g., using the interface module 212) a scrollable listing of icons with which a customer may interact. The icons in the scrollable listing of icons may be associated with catalogs, such that each icon is associated with a different catalog. Each icon in the scrollable listing of icons may be an image, such as a logo, a symbol, or other graphical representation associated with a corresponding catalog. In various embodiments, each catalog associated with an icon is associated with an entity (e.g., a retailer). For example, a catalog associated with an icon may be a catalog of products offered for purchase by a retailer and an icon associated with the catalog in the scrollable listing of icons may be a logo for the retailer. The scrollable listing of icons allows the customer to access multiple catalogs, such that the customer may access a catalog associated with an icon by interacting with the icon. The scrollable listing of icons may be scrollable along an axis (e.g., in a horizontal or a vertical direction) and may include a scrollable bar in which the icons are arranged. The arrangement of the icons may be determined by the client application 250 or the online system 140, as further described below.

Figure 4A:
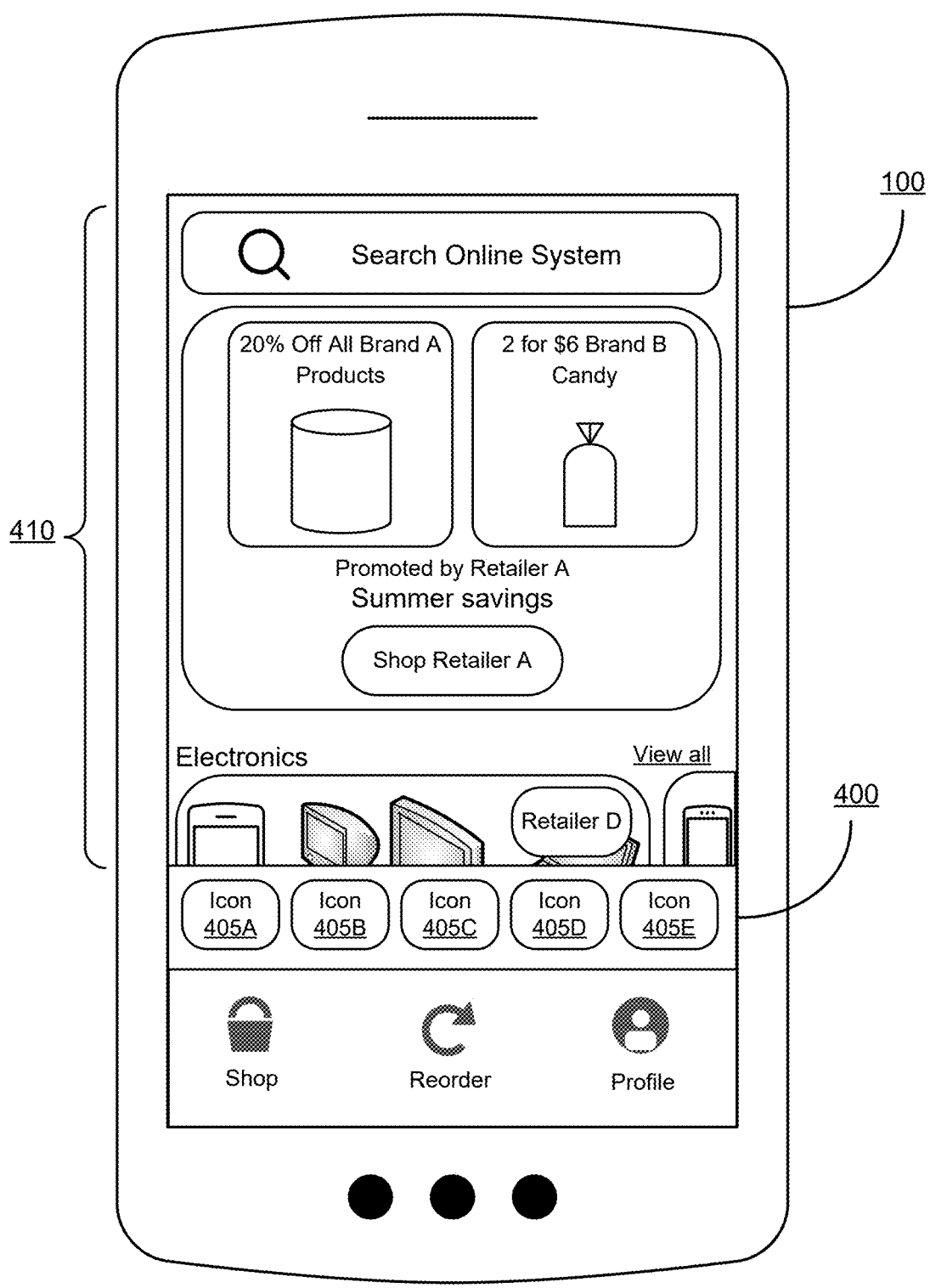
FIG. 4A illustrates an example of displaying a scrollable listing of icons associated with catalogs, in accordance with one or more embodiments.

When displayed 305, the scrollable listing of icons is overlaid onto a page with which the customer may interact. The scrollable listing of icons may remain fixed when the page onto which it is overlaid is scrolled. FIG. 4A illustrates an example of displaying 305 a scrollable listing of icons 400 associated with catalogs, in accordance with one or more embodiments. As shown in the example of FIG. 4A, if the scrollable listing of icons 400 is overlaid onto the bottom of the page 410, the scrollable listing of icons 400 does not change its position as the page 410 is scrolled vertically or horizontally. Furthermore, the scrollable listing of icons 400 also may persist when the page 410 onto which it is overlaid is updated. In some embodiments, the scrollable listing of icons 400 and the page 410 onto which it is overlaid are scrollable along different axes. For example, the scrollable listing of icons 400 may be horizontally scrollable while the page 410 onto which it is overlaid may be vertically scrollable, or vice versa.

The page 410 onto which the scrollable listing of icons 400 is overlaid may be generated and transmitted/displayed by the client application 250 or the online system 140 (e.g., using the interface module 212). In some embodiments, the page 410 onto which the scrollable listing of icons 400 is overlaid is a home page associated with the online system 140. The home page may include user interface elements (e.g., buttons to reorder items or to access customer profile information, scroll bars, menus, etc.), content items (e.g., advertisements, images, videos, etc.) associated with various retailers, information associated with the online system 140, or any other suitable types of content. For example, as shown in FIG. 4A, the home page may include various advertisements, coupons, etc. for items included among the inventories of various retailers that allow customers who interact with them to add the items to shopping lists associated with the corresponding retailers.

As described above, each icon in the scrollable listing of icons 400 is associated with a catalog. A catalog may include items, such as goods (e.g., food, beverages, clothing, etc.), services (e.g., video streaming services), videos (e.g., movies, shows, etc.), audio files (e.g., music albums, podcasts, etc.), images (e.g., photos, GIFs), games (e.g., mobile gaming applications), or any other suitable types of items. For example, as shown in FIG. 4A, each icon 405A-E in the scrollable listing of icons 400 may be associated with a catalog of items, such that the customer may add one or more items included in a catalog to a list. In this example, a catalog may include goods or products that the customer may add to a shopping list and subsequently order. In the above example, a catalog also may include shows or movies that the customer may add to a watch list, songs or podcasts that the customer may add to a playlist, photos that the customer may add to a list of saved or favorite images, etc. Each icon 405 in the scrollable listing of icons 400 may be displayed 305 with various types of information associated with a corresponding catalog. This information may allow the customer to manage shopping sessions associated with multiple catalogs simultaneously. Examples of such types of information are shown in FIGS. 4B-4E (described below) and may include: an indication of a set of items selected from the catalog, a total cost associated with the set of items selected from the catalog, a delivery time for an order including the set of items selected from the catalog, or any other suitable types of information. Furthermore, this information may be dynamic (e.g., by changing periodically or in response to a user interaction), as described above.

Figure 4B:
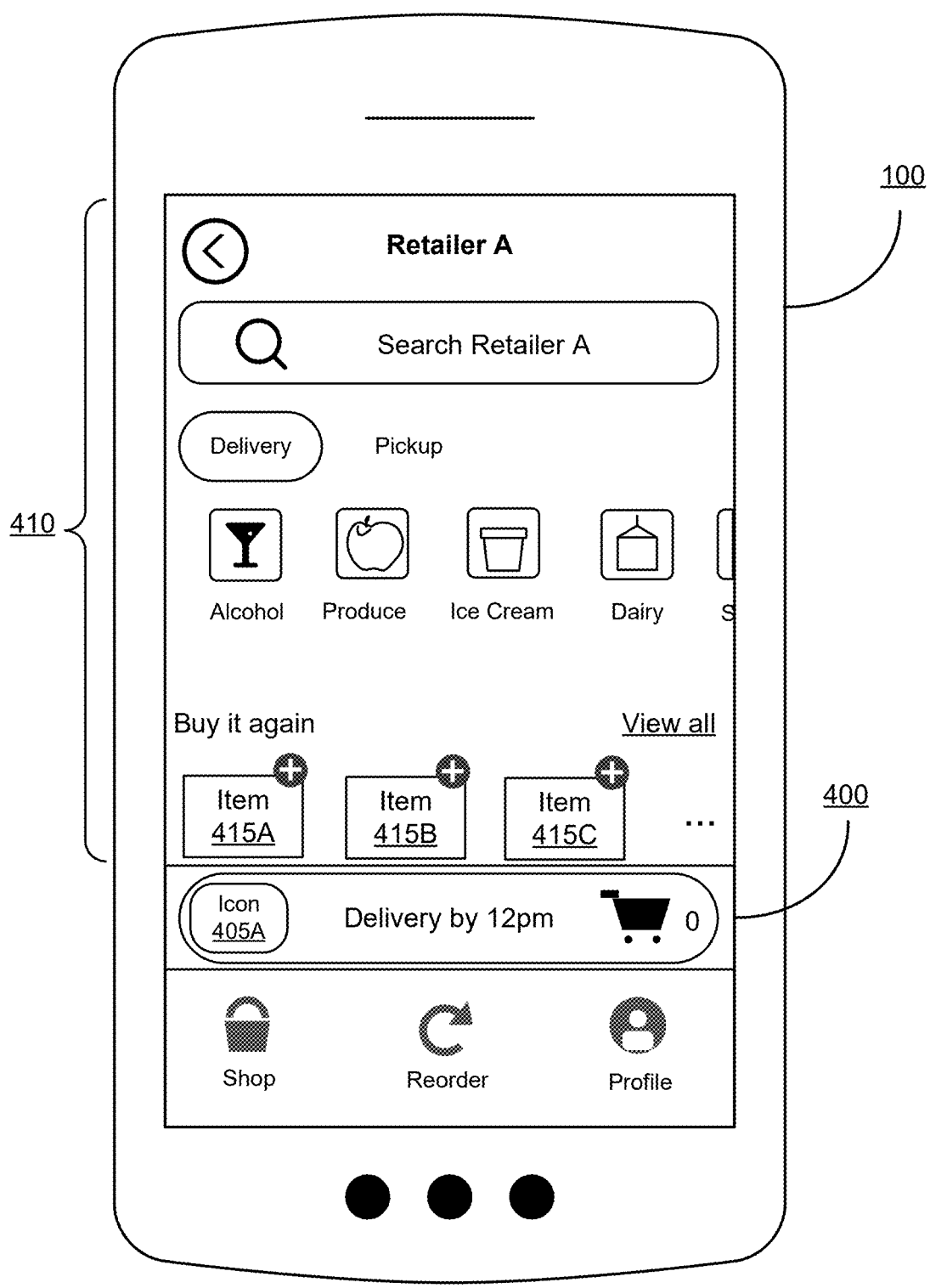
FIG. 4B illustrates an example of updating a page to include items included in a catalog associated with an icon selected from a scrollable listing of icons, in accordance with one or more embodiments.

Referring back to FIG. 3, the client application 250 or the online system 140 updates 310 (e.g., using the interface module 212) the page 410 onto which the scrollable listing of icons 400 is overlaid and transmits/displays (e.g., using the interface module 212) the updated page 410. In some embodiments, the client application 250 or the online system 140 updates 310 the page 410 onto which the scrollable listing of icons 400 is overlaid in response to receiving (e.g., via the interaction module 214) a user selection of an icon 405 from the scrollable listing of icons 400, such that the page 410 is updated 310 to include one or more items included in a catalog associated with the selected icon 405 or other information associated with the catalog. The page 410 also may be updated 310 to include user interface elements that allow the customer to interact with the page 410 (e.g., buttons to reorder items or to return to the home page associated with the online system 140, scroll bars, menus, etc.), or any other suitable types of content. FIG. 4B illustrates an example of updating a page 410 to include items 415 included in a catalog associated with an icon 405 selected from a scrollable listing of icons 400, in accordance with one or more embodiments, and continues the example described above in conjunction with FIG. 4A. As shown in the example of FIG. 4B, in response to receiving a user selection of icon 405A, the page 410 may be updated 310 to be a storefront for a retailer, such that the page 410 includes items 415A-C offered for purchase by the retailer included in a catalog associated with icon 405A and details associated with each item 415A-C (e.g., its price and availability at a particular retailer location operated by the retailer). Alternatively, in the above example, the page 410 may be updated 310 to include information associated with the retailer, such as a list of retailer locations associated with the retailer within a threshold distance of a location associated with the customer, hours of operation associated with each retailer location, etc.

Once the client application 250 or the online system 140 updates 310 and transmits/displays the page 410 onto which the scrollable listing of icons 400 is overlaid, the customer may interact with the updated page 410. For example, as shown in FIG. 4B, the customer may interact with the updated page 410 by selecting an option to add an item 415A-C to a shopping list associated with the catalog, to view more information associated with an item 415A-C, to search for an item 415, to check out, to return to the home page associated with the online system 140, etc. In some embodiments, the client application 250 or the online system 140 updates 310 the page 410 onto which the scrollable listing of icons 400 is overlaid in response to receiving (e.g., via the interaction module 214) a user selection to return to a home page associated with the online system 140. For example, the page 410 may be updated 310 to be a home page associated with the online system 140, such that it includes user interface elements to navigate the home page, content items associated with various retailers, information associated with the online system 140, etc.

Figure 4C:
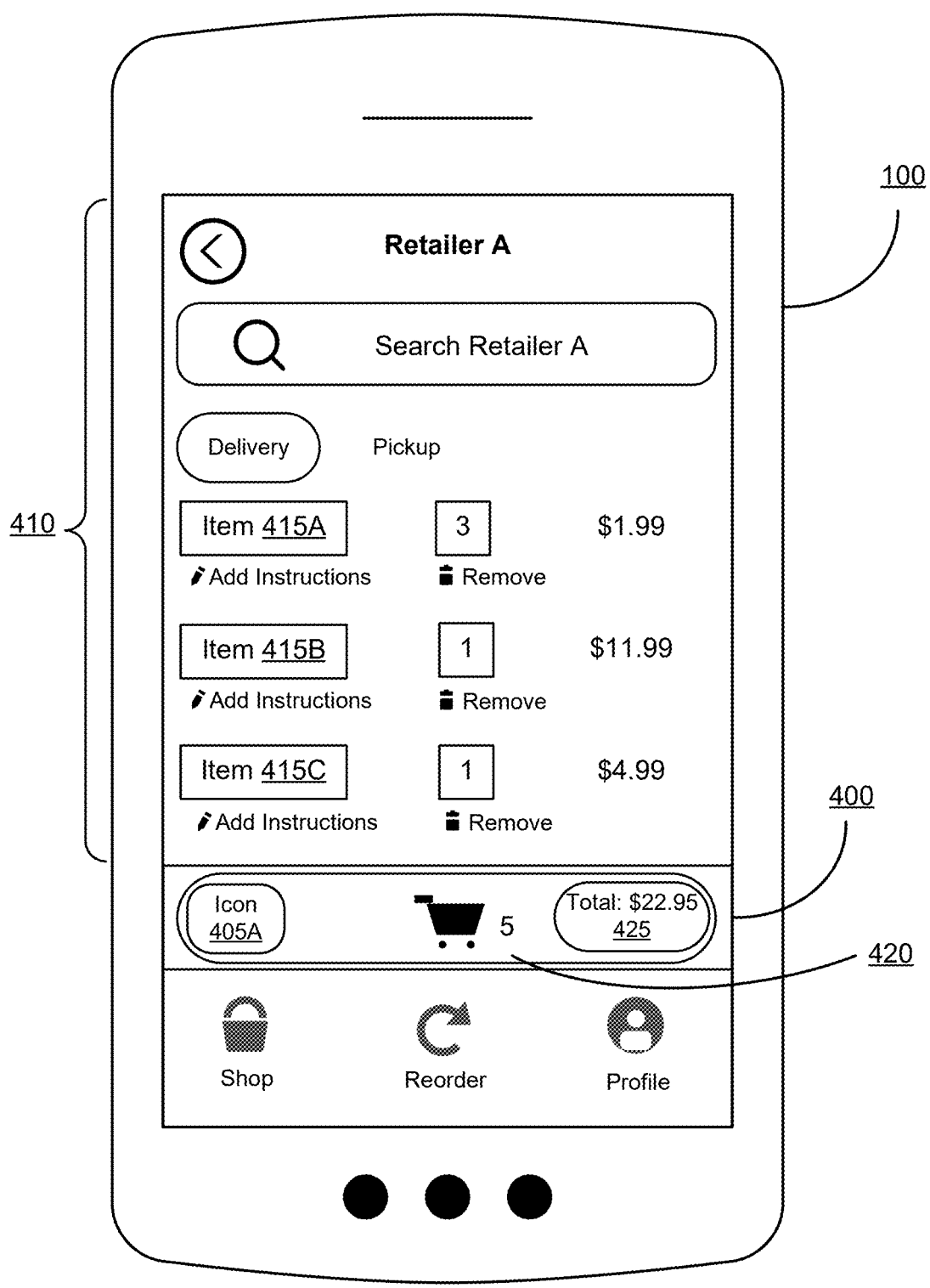
FIGS. 4C and 4D illustrate an example of updating an indication displayed with an icon in a scrollable listing of icons to indicate an item added from a corresponding catalog, in accordance with one or more embodiments.
Figure 4D:
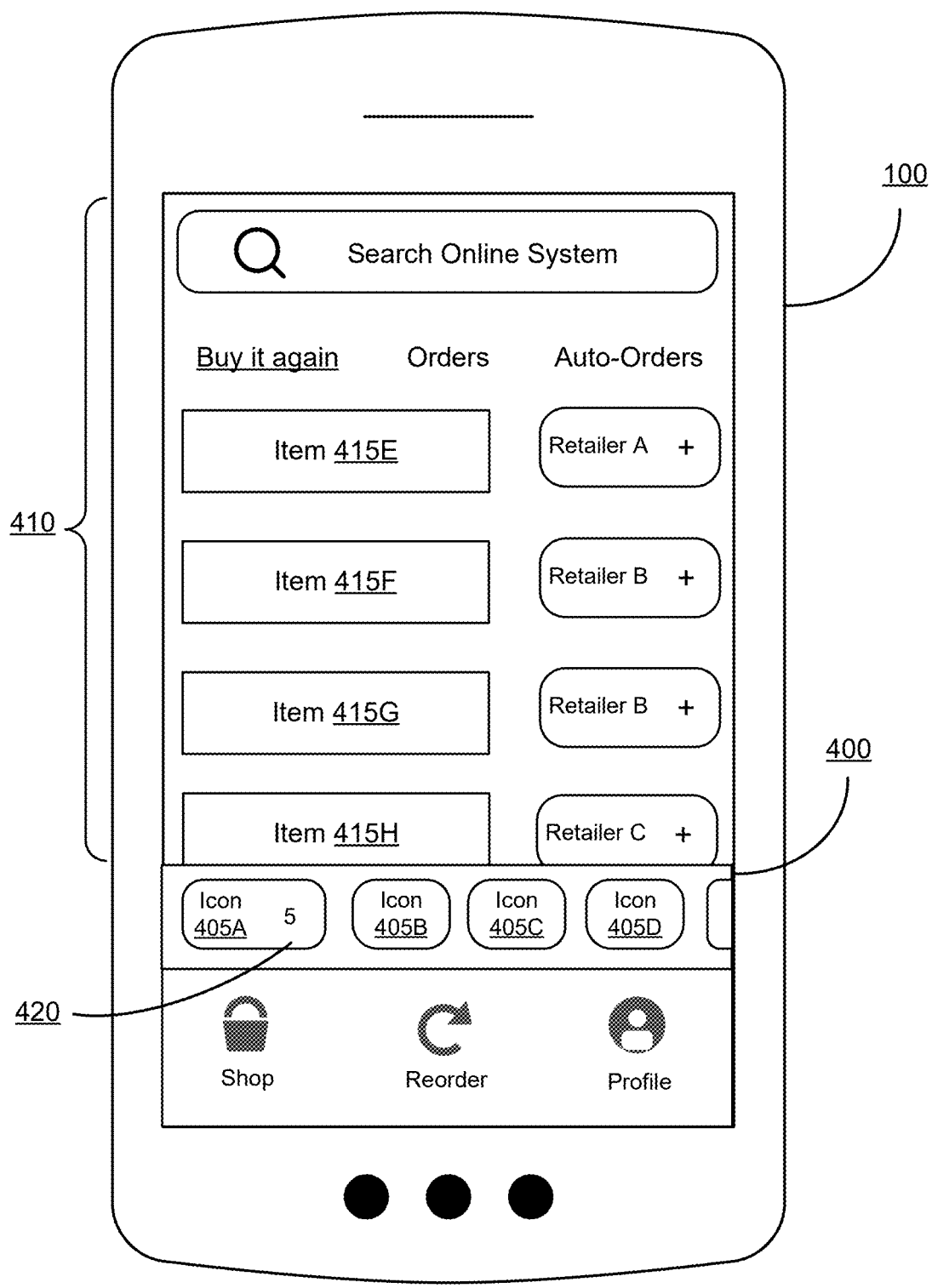

Referring back to FIG. 3, the client application 250 or the online system 140 updates 315 (e.g., using the interface module 212) the scrollable listing of icons 400 and transmits/displays (e.g., using the interface module 212) the updated scrollable listing of icons 400. In some embodiments, the client application 250 or the online system 140 updates 315 information displayed 305 with an icon 405 included in the scrollable listing of icons 400 in response to receiving (e.g., via the interaction module 214) a user interaction. FIGS. 4C and 4D illustrate an example of updating 315 an indication 420 displayed 305 with an icon 405 in a scrollable listing of icons 400 to indicate an item 415 added from a corresponding catalog, in accordance with one or more embodiments, and continue the example described above in conjunction with FIGS. 4A and 4B. As shown in the example of FIG. 4C, in response to receiving a user selection to add one or more items 415A-C from a catalog to a shopping list associated with the catalog or to remove one or more items 415A-C from the shopping list, the client application 250 or the online system 140 may update 315 the scrollable listing of icons 400, such that an indication 420 of a number of items 415A-C included in the shopping list associated with the catalog displayed 305 beside icon 405A reflects the number of items 415A-C in the shopping list. As also shown in FIG. 4C, the client application 250 or the online system 140 also may update 315 the scrollable listing of icons 400 to include a total cost 425 associated with the items 415A-C in the shopping list beside icon 405A. Continuing with the above example, in response to receiving a user selection to return to a home page associated with the online system 140, the client application 250 or the online system 140 may update 315 the scrollable listing of icons 400 by collapsing the information displayed 305 with icon 405A (e.g., to only include the indication 420 of the number of items 415A-C in the shopping list), as shown in FIG. 4D.

Figure 4E:
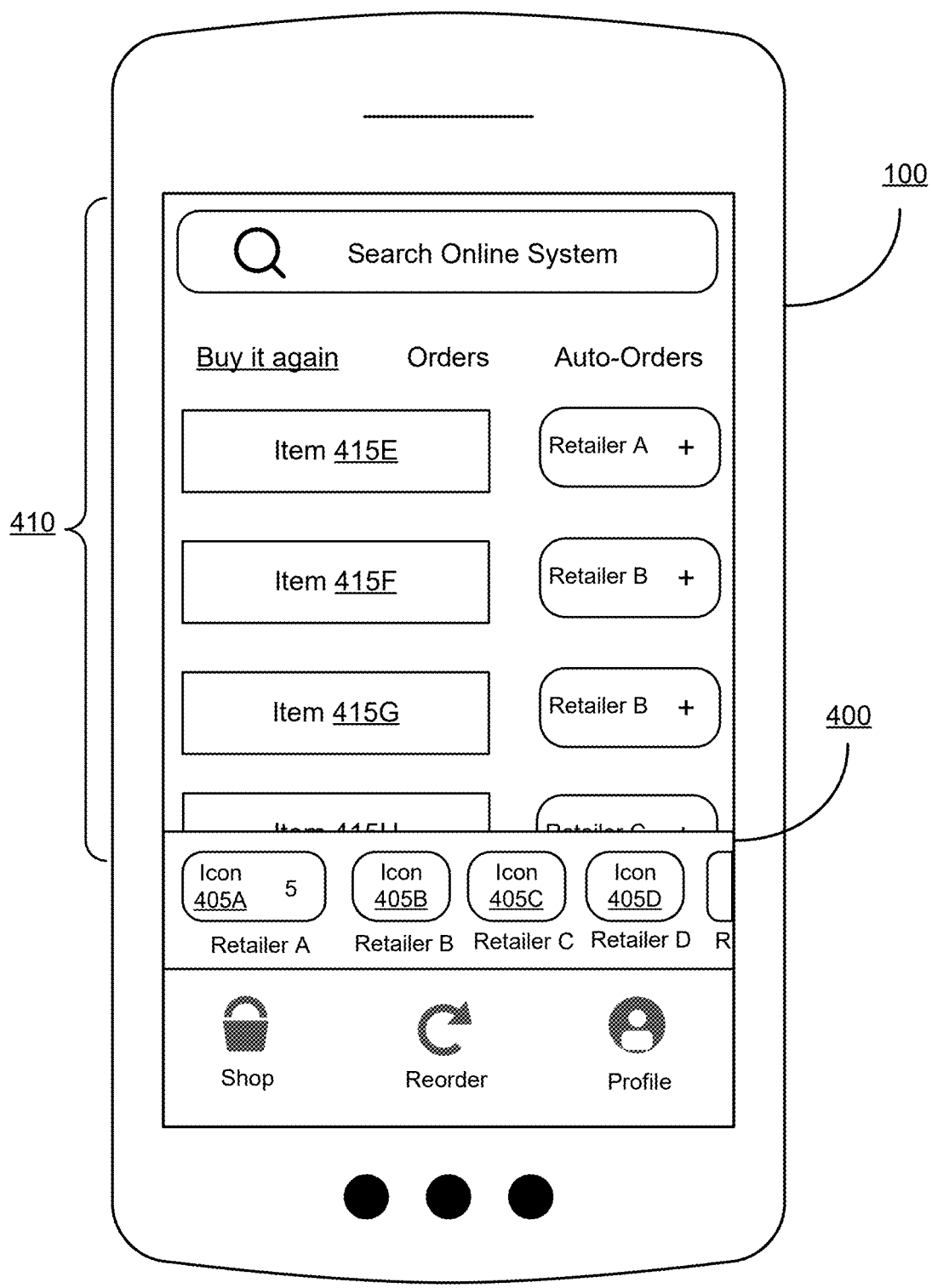
FIG. 4E illustrates an example of updating a scrollable listing of icons associated with catalogs to include a name associated with each icon, in accordance with one or more embodiments.

The client application 250 or the online system 140 also may update 315 the scrollable listing of icons 400 in other ways. In some embodiments, the client application 250 or the online system 140 updates 315 the scrollable listing of icons 400 to include a name associated with each icon 405 in response to receiving (e.g., via the interaction module 214) a user interaction with the scrollable listing of icons 400. FIG. 4E illustrates an example of updating 315 a scrollable listing of icons 400 associated with catalogs to include a name associated with each icon 405, in accordance with one or more embodiments, and continues the example described above in conjunction with FIGS. 4A-4D. As shown in the example of FIG. 4E, in response to receiving a user selection to scroll through the scrollable listing of icons 400, the client application 250 or the online system 140 may update 315 the scrollable listing of icons 400 to include a name of a retailer associated with each icon 405. Continuing with this example, in response to receiving a user selection anywhere other than the scrollable listing of icons 400, the client application 250 or the online system 140 may update 315 the scrollable listing of icons 400, such that it no longer includes the name of the retailer associated with each icon 405. In some embodiments, the client application 250 or the online system 140 updates 315 the arrangement of the icons 405 included in the scrollable listing of icons 400, which may be determined by the client application 250 or the online system 140, as further described below.

In various embodiments, the client application 250 or the online system 140 determines (e.g., using the icon arrangement module 216) the arrangement of icons 405 in the scrollable listing of icons 400 based on various types of information associated with the customer. Information associated with the customer may include an order history associated with the customer, a set of preferences associated with the customer, or any other suitable types of information. For example, suppose that each icon 405 included in the scrollable listing of icons 400 is associated with a retailer. In this example, the client application 250 or the online system 140 may determine the arrangement of icons 405 based on a set of preferences associated with the customer and an order history associated with the customer, such that icons 405 associated with retailers from which the customer most frequently ordered items 415 and that are most likely to have the customer's favorite items 415 in stock are in the most prominent positions of the scrollable listing of icons 400 (e.g., furthest to the left).

In some embodiments, the client application 250 or the online system 140 determines the arrangement of icons 405 in the scrollable listing of icons 400 based on a predicted likelihood of conversion by the customer associated with each catalog associated with the icons 405. A conversion may correspond to adding one or more items 415 included in a catalog to a list (e.g., a shopping list, a watch list, a wish list, a playlist, etc.), ordering one or more items 415 included in a catalog, or any other suitable type of action associated with a catalog that may be performed by a customer. In embodiments in which the client application 250 or the online system 140 determines the arrangement of icons 405 in the scrollable listing of icons 400 based on a predicted likelihood of conversion by the customer associated with each catalog associated with the icons 405, the client application 250 or the online system 140 may make the prediction based on information associated with the customer (e.g., the customer's order history, preferences, etc.). For example, the client application 250 or the online system 140 may predict a high likelihood of conversion by the customer associated with a catalog if the customer previously placed several orders including items 415 included in the catalog, if the catalog includes several of the customer's favorite items 415 and the items 415 are likely to be available, etc. Alternatively, in the above example, the client application 250 or the online system 140 may predict a low likelihood of conversion by the customer associated with the catalog if the customer has never placed orders including items 415 included in the catalog, if the catalog includes none of the customer's favorite items 415 or if the customer's favorite items 415 included in the catalog are unlikely to be available, etc.

In some embodiments, the client application 250 or the online system 140 predicts a likelihood of conversion by the customer associated with a catalog using a conversion prediction model, which is a machine learning model that is trained to predict a likelihood of conversion by a customer associated with a catalog. The conversion prediction model may be trained (e.g., by the online system 140 using the machine learning training module 230) based on attributes of catalogs, attributes of items 415 included in the catalogs, attributes of customers, or any other suitable types of information. To use the conversion prediction model, the client application 250 or the online system 140 may access the model (e.g., from the data store 240) and apply the model to a set of attributes of the customer (e.g., household size, historical order information, price sensitivity, budget, etc. associated with the customer) and a set of attributes of a catalog (e.g., a retailer or other entity associated with the catalog, information describing items 415 included in the catalog, etc.). The client application 250 or the online system 140 also may apply the model to a set of attributes of items 415 included in the catalog (e.g., brands, item categories, price ranges, predicted availabilities, etc. of the items 415). The client application 250 or the online system 140 may then receive an output from the conversion prediction model corresponding to a predicted likelihood of conversion by the customer associated with the catalog.

Once the client application 250 or the online system 140 has predicted a likelihood of conversion by the customer associated with each catalog associated with the icons 405 in the scrollable listing of icons 400, the client application 250 or the online system 140 may rank the catalogs based on the predicted likelihoods and determine the arrangement of the icons 405 in the scrollable listing of icons 400 based on the ranking. For example, the client application 250 or the online system 140 may rank the catalogs based on their associated predicted likelihoods of conversion by the customer, such that catalogs associated with higher predicted likelihoods are ranked higher than catalogs associated with lower predicted likelihoods. In this example, the client application 250 or the online system 140 may determine the arrangement of icons 405 in the scrollable listing of icons 400 based on the ranking, such that the icon 405 associated with the highest ranked catalog is in a most prominent position of the scrollable listing of icons 400 (e.g., furthest to the left), the icon 405 associated with the second-highest ranked catalog is in a second-most prominent position, etc.

In some embodiments, the client application 250 or the online system 140 also or alternatively determines the arrangement of icons 405 in the scrollable listing of icons 400 based on additional types of information. The client application 250 or the online system 140 may rank the catalogs based on the additional information and determine the arrangement of icons 405 in the scrollable listing of icons 400 based on the ranking. For example, based on a likelihood of conversion by the customer associated with each catalog associated with the icons 405 in the scrollable listing of icons 400 and one or more bid amounts associated with one or more catalogs (e.g., computed as a sum of the predicted likelihood associated with each catalog and a bid amount associated with the catalog, if any), the client application 250 or the online system 140 may rank the catalogs. In this example, the client application 250 or the online system 140 may determine the arrangement of icons 405 in the scrollable listing of icons 400 based on the ranking, such that the icon 405 associated with the highest ranked catalog is in a most prominent position of the scrollable listing of icons 400 (e.g., furthest to the left), the icon 405 associated with the second-highest ranked catalog is in a second-most prominent position, etc.

The client application 250 or the online system 140 also or alternatively may determine the arrangement of icons 405 in the scrollable listing of icons 400 based on a recency with which the customer interacted with each catalog, based on a number of items 415 selected from each catalog (e.g., to include in a shopping list), based on a delivery time associated with each catalog, or based on any other suitable types of information. For example, in response to receiving a user selection to add an item 415 to a shopping list associated with a catalog, the client application 250 or the online system 140 may determine the arrangement of the icons 405 in the scrollable listing of icons 400, such that an icon 405 associated with the catalog is placed in a most prominent position of the scrollable listing of icons 400 (e.g., furthest to the left) or is separated from the other icons 405 to indicate that it is associated with a catalog with which a customer most recently interacted. As an additional example, the client application 250 or the online system 140 may determine the arrangement of the icons 405 in the scrollable listing of icons 400 based on the numbers of items 415 included in shopping lists associated with the icons 405, such that the icons 405 are ordered from left to right in descending order of number of items 415 included in the shopping lists associated with the icons 405. As yet another example, the client application 250 or the online system 140 may determine the arrangement of the icons 405 in the scrollable listing of icons 400 based on the delivery times associated with the catalogs associated with the icons 405, such that the icons 405 are ordered from left to right from earliest delivery time to latest delivery time.

Additional Considerations

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any embodiment of a computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include: applying the machine learning model to a training example, comparing an output of the machine learning model to the label associated with the training example, and updating weights associated with the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:
   generating a user interface that comprises a scrollable listing of a plurality of icons, wherein the scrollable listing of the plurality of icons is overlaid onto a page and remains fixed when the page is scrolled, each icon is associated with a catalog of a plurality of catalogs, and each icon is displayed with an indication of a set of items selected from a corresponding catalog;
   presenting the generated user interface on a display screen of a user device;
   receiving a user selection of an icon from the scrollable listing of the plurality of icons;
   responsive to receiving the user selection of the icon from the scrollable listing of the plurality of icons, updating the page to include a plurality of items included in a catalog associated with the selected icon;
   receiving a user selection to add an item from the page including the plurality of items; and
   responsive to receiving the user selection to add the item from the page including the plurality of items, updating the indication displayed with the selected icon in the scrollable listing of the plurality of icons to indicate that the item has been added.

2. The method of claim 1, wherein each catalog of the plurality of catalogs is associated with a retailer.

3. The method of claim 1, wherein the page and the scrollable listing of the plurality of icons are scrollable along different orthogonal axes.

4. The method of claim 1, further comprising:
   receiving a user selection to scroll through the scrollable listing of the plurality of icons; and
   responsive to receiving the user selection to scroll through the scrollable listing of the plurality of icons, updating the scrollable listing of the plurality of icons to include a name associated with each icon.

5. The method of claim 1, wherein an arrangement of the plurality of icons in the scrollable listing of the plurality of icons is based at least in part on a set of information associated with a user, wherein the set of information comprises one or more of: an order history associated with the user and a set of preferences associated with the user.

6. The method of claim 5, further comprising:
   predicting, using a machine learning model, a likelihood of conversion by the user associated with each catalog of the plurality of catalogs based at least in part on the set of information associated with the user;
   ranking the plurality of catalogs based at least in part on the predicted likelihood of conversion by the user associated with each catalog of the plurality of catalogs; and
   determining the arrangement of the plurality of icons in the scrollable listing of the plurality of icons based at least in part on the ranking.

7. The method of claim 6, further comprising:
   training the machine learning model to predict the likelihood of conversion by the user associated with each catalog of the plurality of catalogs based at least in part on the set of information associated with each user of a plurality of users and a set of information associated with each catalog of the plurality of catalogs;
   applying the machine learning model to predict the likelihood of conversion by the user associated with each catalog of the plurality of catalogs;
   logging additional training data, wherein the additional training data includes a training example comprising whether a conversion occurred by the user in response to the applying; and
   retraining the machine learning model based on the additional training data.

8. The method of claim 1, wherein an arrangement of the plurality of icons in the scrollable listing of the plurality of icons in the user interface is generated based at least in part on one or more bid amounts associated with one or more catalogs of the plurality of catalogs.

9. The method of claim 8, further comprising:
   ranking the plurality of catalogs based at least in part on the one or more bid amounts associated with the one or more catalogs of the plurality of catalogs; and
   determining the arrangement of the plurality of icons in the scrollable listing of the plurality of icons based at least in part on the ranking.

10. The method of claim 1, wherein an arrangement of the plurality of icons in the scrollable listing of the plurality of icons is based at least in part on a number of items selected from each catalog of the plurality of catalogs.

11. A computer program product comprising a non-transitory computer-readable storage medium having instructions encoded thereon that, when executed by a processor, cause the processor to perform steps comprising:
   generating a user interface that comprises a scrollable listing of a plurality of icons, wherein the scrollable listing of the plurality of icons is overlaid onto a page and remains fixed when the page is scrolled, each icon is associated with a catalog of a plurality of catalogs, and each icon is displayed with an indication of a set of items selected from a corresponding catalog;

presenting the generated user interface on a display screen of a user device;

receiving a user selection of an icon from the scrollable listing of the plurality of icons;

responsive to receiving the user selection of the icon from the scrollable listing of the plurality of icons, updating the page to include a plurality of items included in a catalog associated with the selected icon;

receiving a user selection to add an item from the page including the plurality of items; and responsive to receiving the user selection to add the item from the page including the plurality of items, updating the indication displayed with the selected icon in the scrollable listing of the plurality of icons to indicate that the item has been added.

12. The computer program product of claim 11, wherein each catalog of the plurality of catalogs is associated with a retailer.

13. The computer program product of claim 11, wherein the page and the scrollable listing of the plurality of icons are scrollable along different orthogonal axes.

14. The computer program product of claim 11, wherein the computer-readable storage medium further has instructions encoded thereon that, when executed by the processor, cause the processor to perform steps comprising:

receiving a user selection to scroll through the scrollable listing of the plurality of icons; and responsive to receiving the user selection to scroll through the scrollable listing of the plurality of icons, updating the scrollable listing of the plurality of icons to include a name associated with each icon.

15. The computer program product of claim 11, wherein an arrangement of the plurality of icons in the scrollable listing of the plurality of icons is based at least in part on a set of information associated with a user, wherein the set of information comprises one or more of: an order history associated with the user and a set of preferences associated with the user.

16. The computer program product of claim 15, wherein the computer-readable storage medium further has instructions encoded thereon that, when executed by the processor, cause the processor to perform steps comprising:

predicting, using a machine learning model, a likelihood of conversion by the user associated with each catalog of the plurality of catalogs based at least in part on the set of information associated with the user;

ranking the plurality of catalogs based at least in part on the predicted likelihood of conversion by the user associated with each catalog of the plurality of catalogs; and determining the arrangement of the plurality of icons in the scrollable listing of the plurality of icons based at least in part on the ranking.

17. The computer program product of claim 16, wherein the computer-readable storage medium further has instructions encoded thereon that, when executed by the processor, cause the processor to perform steps comprising:

training the machine learning model to predict the likelihood of conversion by the user associated with each catalog of the plurality of catalogs based at least in part on the set of information associated with each user of a plurality of users and a set of information associated with each catalog of the plurality of catalogs;

applying the machine learning model to predict the likelihood of conversion by the user associated with each catalog of the plurality of catalogs;

logging additional training data, wherein the additional training data includes a training example comprising whether a conversion occurred by the user in response to the applying; and retraining the machine learning model based on the additional training data.

18. The computer program product of claim 11, wherein an arrangement of the plurality of icons in the scrollable listing of the plurality of icons in the user interface is generated based at least in part on one or more bid amounts associated with one or more catalogs of the plurality of catalogs.

19. The computer program product of claim 18, wherein the computer-readable storage medium further has instructions encoded thereon that, when executed by the processor, cause the processor to perform steps comprising:

ranking the plurality of catalogs based at least in part on the one or more bid amounts associated with the one or more catalogs of the plurality of catalogs; and determining the arrangement of the plurality of icons in the scrollable listing of the plurality of icons based at least in part on the ranking.

20. A computer system comprising:

a processor; and a non-transitory computer-readable storage medium storing instructions that, when executed by the processor, perform steps comprising:

generating a user interface that comprises a scrollable listing of a plurality of icons, wherein the scrollable listing of the plurality of icons is overlaid onto a page and remains fixed when the page is scrolled, each icon is associated with a catalog of a plurality of catalogs, and each icon is displayed with an indication of a set of items selected from a corresponding catalog;

presenting the generated user interface on a display screen of a user device;

receiving a user selection of an icon from the scrollable listing of the plurality of icons;

responsive to receiving the user selection of the icon from the scrollable listing of the plurality of icons, updating the page to include a plurality of items included in a catalog associated with the selected icon;

receiving a user selection to add an item from the page including the plurality of items; and responsive to receiving the user selection to add the item from the page including the plurality of items, updating the indication displayed with the selected icon in the scrollable listing of the plurality of icons to indicate that the item has been added.

\* \* \* \* \*